United States Patent [19]

Buckman et al.

[11] 3,854,928

[45] Dec. 17, 1974

[54] METHOD FOR INCREASING YIELD OF SUGARCANE

[75] Inventors: Stanley J. Buckman; Miguel L. Pulido, both of Memphis, Tenn.

[73] Assignee: Buckman Laboratories, Inc., Memphis, Tenn.

[22] Filed: Nov. 14, 1973

[21] Appl. No.: 415,698

[52] U.S. Cl. .................................................. 71/121
[51] Int. Cl. ............................................... A01n 9/20
[58] Field of Search ...................................... 71/121

[56] References Cited
OTHER PUBLICATIONS

S. African Pat. 6,908,949 – Chem. Abst., Vol. 74, (1971), 64844p.

*Primary Examiner*—Lewis Gotts
*Assistant Examiner*—Catherine L. Mills
*Attorney, Agent, or Firm*—Floyd E. Trimble

[57] ABSTRACT

The sucrose content of growing sugarcane is increased by application to the plant foliage of an effective amount of poly[oxyethylene(dimethyliminio)ethylene(dimethyliminio)ethylene chloride].

5 Claims, No Drawings

3,854,928

METHOD FOR INCREASING YIELD OF SUGARCANE

BACKGROUND OF THE INVENTION

1. Field of the Invention

This invention relates to a process for increasing the sucrose content of growing sugarcane. Much work has been done in the past toward increasing the yield of recoverable sugar from sugarcane. Some progress has been made in this area by development of improved plant varieties. Also, enrichment of the soil by fertilizer application, and irrigation where natural moisture is insufficient for optimum plant growth, have been utilized with worthwhile results. More recently, efforts in improving sugar production have been directed toward development of chemical treatment of the sugarcane plants. There has been a continuing need for improved methods for treatment of growing sugarcane plants to obtain improved yields.

2. Description of the Prior Art

A large number of processes have been developed in recent years for specific chemical treatment methods to provide increased yields of sugarcane. Exemplary of such methods are those described in U.S. Pat. Nos. 3,291,592; 3,482,958; 3,482,959; 3,482,961; 3,493,361; 3,556,762; 3,556,764; 3,671,219; and 3,767,377.

The methods described in the above patents have been effective to varying degrees, but the industry is constantly searching for improved methods of increasing the sugar content of growing sugarcane. Some of the prior art methods require the use of expensive surfactant materials to obtain satisfactory application of the treatment material. Others of the prior art methods produce insufficient increase in sugar yield for economic utilization.

SUMMARY OF THE INVENTION

According to the present invention, poly[oxyethylene(dimethyliminio)-ethylene(dimethylimino)ethylene dichloride] is applied to the foliage of growing sugarcane several weeks prior to harvest. The material is conveniently applied by spraying an aqueous solution onto the foliage using conventional equipment. Since the material is water soluble, there are no unusual handling problems associated with the process.

In accordance with the invention, sugarcane plants are treated from two to twelve weeks prior to harvest, with the preferred time for treatment being between 3 and 8 weeks prior to harvest. Best results are obtained when about 2.5 to 4.0 pounds of the active ingredient are applied per acre of sugarcane crop, although as little as one pound per acre can provide a beneficial effect, and up to 10 pounds per acre provides a beneficial effect. More than 10 pounds per acre is normally not preferred because of diminished improvement and increased costs, although it will be appreciated that the optimum amount depends on many factors such as density of plants, type or variety of plants, efficiency of applilcation, etc. Rainfall within a few hours of application is deleterious, and to the extent that it is possible the treatment should take place when rainfall is not imminent.

Since the active ingredient according to this invention is water soluble, it is preferably applied as an aqueous solution, such as a solution containing from 1 to 10 pounds of active ingredient per 10 to 40 gallons of water. The precise amount and concentration depends on the treatment level desired and the type of equipment being used.

It is an object of the invention to provide a method of increasing the sucrose content of growing sugarcane plants.

It is a further object to provide such a method utilizing an effective amount of the specified material in a preharvest treatment.

The above as well as additional objects and advantages are provided by the present invention as will be apparent from the following detailed description and examples.

DESCRIPTION OF THE PREFERRED EMBODIMENT

The compound which is effective in increasing the sucrose content of sugarcane in accordance with the invention is a highly water-soluble cationic polymeric polyelectrolyte prepared by reacting dichloroethyl ether with N,N,-N',N'-tetramethylethylenediamine in an aqueous medium. Generally the polymers prepared by this reaction have molecular weights varying from about 1,000 to about 10,000. They may be further characterized by formula and name as approved by the editors of Chemical Abstracts as follows:

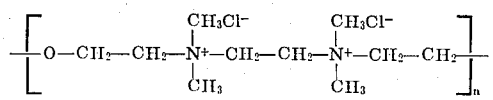

Poly[oxyethylene(dimethyliminio)ethylene-(dimethyliminio)ethylene dichloride]

wherein $n$ is an integer varying from 4 to 40.

The compound may be prepared as illustrated in the following example.

EXAMPLE I

Preparation of poly[oxyethylene(dimethyliminio)-ethylene(dimethyliminio)ethylene dichloride]

A 300-gallon stainless steel reactor fitted with a stirrer was charged with 317 pounds of N,N,N',N'-tetramethylethylenediamine, 392 pounds of dichloroethyl ether, and 381 pounds of water. The contents were stirred and hot water was introduced into the jacket. The temperature was maintained at 93°–102° C. for a period of 16 hours. At the end of this period, the resulting aqueous polymer solution was cooled and removed from the reactor. The polymer had a reduced viscosity of 0.3, wherein reduced viscosity is defined as the specific viscosity divided by the concentration in grams per 100 milliliters. In this example, a concentration of 0.2 gram of polymer per 100 milliliters of water was used to determine the reduced viscosity.

Additional poly[oxyethylene(dimethyliminio)ethylene(dimethyliminio)ethylene dichloride] polymers were prepared having molecular weights varying from 1,000 to 10,000 by varying the reaction conditions in processes generally similar to that of Example I.

The utility of the invention has been demonstrated in actual field tests. In one such test, conducted on field plots of sugarcane variety NCo 376 in South Africa, the compound of this invention was tested against a standard ripener of unknown chemical composition used in an amount recommended by the manufacturer. Untreated controls were also measured. The compound of this invention was applied to the foliage of the developing sugarcane plants as an aqueous spray at the indicated levels of active ingredient. Results are tabulated in the following table.

TABLE I

| Treatment | Estimate of recoverable sugar (Percent of cane ground) Weeks after spraying | | |
|---|---|---|---|
| | 4 | 7 | 10 |
| Control | 5.3 | 8.3 | 8.6 |
| Standard ripener | 5.4 | 8.7 | 10.3 |
| Compound of the invention (kg./hectare) | | | |
| 2.0 | 5.3 | 7.4 | 8.1 |
| 4.0* | 5.4 | 8.8 | 9.5 |
| 8.0 | 5.7 | 7.4 | 9.2 |

*Equivalent to 3.6 pounds per acre.

In another field test, carried out in a Louisiana sugarcane field, the compound of the invention was tested against an untreated control and against a commercial ripener used as recommended by its manufacturer. The test was performed on sugarcane variety L65-69, and the compound of the invention was applied to foliage as a spray of active ingredient in water at the rate of 20 gallons of solution per acre. The amount of active ingredient was as indicated in the following table.

TABLE II

| Treatment | | Weeks after treatment | Estimated sucrose Lb./ton of stalks | Increase based on control Percent |
|---|---|---|---|---|
| Control | | 3 | 210 | — |
| Commercial ripener (3.5 lb./acre) | | 3 | 225 | 7 |
| Invention | (2.9 lb./acre) | 3 | 228 | 9 |
| do. | (5.8 lb./acre) | 3 | 220 | 5 |
| do. | (2.9 lb./acre) | 6 | 228 | 9 |
| do. | (5.8 lb./acre) | 6 | 225 | 7 |

The above tests demonstrate that the present invention is effective in increasing the recoverable sugar from sugarcane by application of the compound to developing plants several weeks prior to harvest. The optimum amount of active ingredient is between 2.5 and 4.0 pounds per acre, but more or less active ingredient may be used depending on factors such as plant type, efficiency of application, time between application and harvest, etc. In Table II above, it is noted that the increase after 6 weeks was no greater than after 3 weeks. However, heavy rains fell in the days immediately after application, and may have affected performance. The compound should be applied several weeks, preferably from 2 to 12 weeks, prior to harvest.

We claim:

1. A method of increasing the sucrose content of growing sugarcane comprising applying to the foliage of the sugarcane plant prior to harvest, an effective amount of the compound poly[oxyethylene(dimethyliminio)ethylene-(dimethyliminio)ethylene dichloride].

2. The method of claim 1 wherein the compound is applied as a spray of an aqueous solution thereof.

3. The method of claim 1 wherein the compound is applied in an amount of from 1 to 10 pounds per acre.

4. The method of claim 1 wherein the compound is applied in an amount of from 2.5 to 4.0 pounds per acre.

5. The method of claim 1 wherein the compound is applied from 2 to 12 weeks prior to harvest.

* * * * *